No. 695,471. Patented Mar. 18, 1902.
H. T. MILLER.
FRUIT CRATE.
(Application filed July 12, 1901.)
(No Model.)
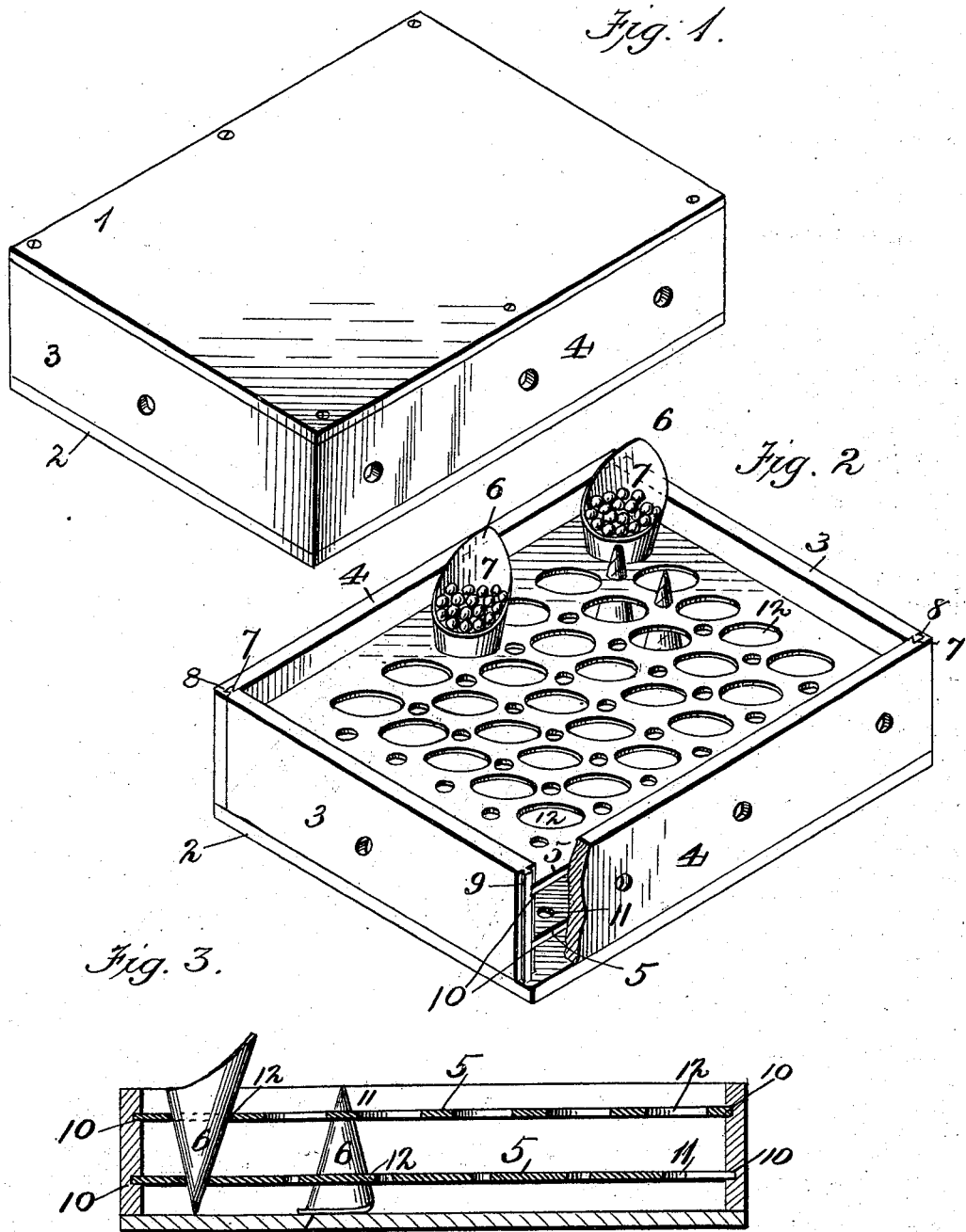

UNITED STATES PATENT OFFICE.

HENRY T. MILLER, OF NORMAN, OKLAHOMA TERRITORY.

FRUIT-CRATE.

SPECIFICATION forming part of Letters Patent No. 695,471, dated March 18, 1902.

Application filed July 12, 1901. Serial No. 68,051. (No model.)

*To all whom it may concern:*

Be it known that I, HENRY T. MILLER, a citizen of the United States, residing at Norman, in the county of Cleveland and Territory of Oklahoma, have invented certain new and useful Improvements in Fruit-Crates, of which the following is a specification.

My invention is a knockdown fruit-crate; and it consists of the knockdown box perforated at its ends and sides and provided with openings for cornucopias and cornucopias to fill said openings.

In the accompanying drawings, Figure 1 is a perspective view of the crate. Fig. 2 is a perspective view of the crate with the lid removed, with one end of one of the side pieces broken away to show the dovetail end of one of the end pieces and the manner in which the shelving is secured in the crate. Fig. 3 is a longitudinal section of the crate.

This invention relates to fruit-shipping, and has for its objects the economizing of space and ventilating the fruit, insuring its better keeping and shipment for long distances.

My invention is described as follows:

Fig. 1 represents the crate closed and ready for shipment.

1 represents the lid; 2, the bottom; 3, the end walls; 4, the side walls; 5, the shelving; 6, the cornucopias, and 7 the fruit. These cornucopias are filled with fruit, as shown in Fig. 2. The side walls are provided with vertical dovetail slots 8 near each end, and the end walls are each provided at each end with dovetail extensions 9, that fit in said slots 8. Said side walls are also provided for their entire length with longitudinal slots 10, in which fit the shelving-boards 5. In the drawings two shelving-boards are shown; but the end and side walls may be made deeper and more shelving-boards may be used, if desired. These shelving-boards are each provided with a number of small and large perforations 11 and 12, respectively; but a fewer or greater number of perforations may be used, according to the size of the crate. The larger perforations 12 in the upper shelving-board stand immediately over the smaller perforations 11 in the under shelving-board and the smaller perforations 11 in the upper shelving-board stand immediately over the larger perforations 12 in the lower shelving-board, and the cornucopias fit in the large and the small holes, end for end alternately, (see Fig. 3,) and when the cornucopias are filled with fruit the flaps 13 (see Fig. 3) are turned down, and thus the fruit is protected and prevented from falling out.

The lid and bottom of the crate are put on with screws, so that when the screws are turned out the box may be knocked down and reshipped. The cornucopias, being made of flexible material, can be folded down and returned with the crate.

Having described my invention, what I claim as new, and desire to secure by Letters Patent, is—

A fruit-shipping crate, consisting of perforated side walls provided at each end with vertical dovetail slots; perforated end walls provided at each end with dovetail extensions, adapted to fit in the dovetail slots in the side walls, and also provided with longitudinal slots; perforated shelving-boards provided alternately with small and large perforations; the small perforations of the upper board being immediately over the large perforations of the lower board, and the large perforations of the upper board being immediately over the small perforations of the lower board; cornucopias adapted to fit alternately in the large and small perforations; said cornucopias having flaps, adapted to be turned down over the fruit; a top and bottom adapted to be screwed onto the upper and lower edges of the end and side walls, substantially as shown and described and for the purposes set forth.

In testimony whereof I affix my signature in presence of two witnesses.

HENRY T. MILLER.

Witnesses:
L. C. KENDALL,
BEN F. WILLIAMS, Jr.